US009089991B2

(12) United States Patent
Schmidt et al.

(10) Patent No.: US 9,089,991 B2
(45) Date of Patent: Jul. 28, 2015

(54) LIGHT WOOD-BASED MATERIALS

(75) Inventors: Michael Schmidt, Speyer (DE); Michael Finkenauer, Westhofen (DE); Günter Scherr, Ludwigshafen (DE); Frank Braun, Ludwigshafen (DE); Stephan Weinkötz, Neustadt (DE); Jürgen von Auenmüller, Oberhausen-Rheinhausen (DE); Oliver Richter, Freinsheim (DE); Maxim Peretolchin, Mannheim (DE)

(73) Assignee: BASF SE (DE)

( * ) Notice: Subject to any disclaimer, the term of this patent is extended or adjusted under 35 U.S.C. 154(b) by 1568 days.

(21) Appl. No.: 12/446,248

(22) PCT Filed: Oct. 18, 2007

(86) PCT No.: PCT/EP2007/061167
§ 371 (c)(1), (2), (4) Date: Apr. 20, 2009

(87) PCT Pub. No.: WO2008/046892
PCT Pub. Date: Apr. 24, 2008

(65) Prior Publication Data

US 2011/0003136 A1 Jan. 6, 2011

(30) Foreign Application Priority Data

Oct. 19, 2006 (EP) .................................... 06122557

(51) Int. Cl.

| | |
|---|---|
| ***B32B 3/26*** | (2006.01) |
| ***B32B 3/00*** | (2006.01) |
| ***B32B 7/12*** | (2006.01) |
| ***B32B 5/20*** | (2006.01) |
| ***B32B 27/00*** | (2006.01) |
| ***B27N 3/00*** | (2006.01) |

(52) U.S. Cl.
CPC ............... *B27N 3/005* (2013.01); *Y10T 428/25* (2015.01); *Y10T 428/253* (2015.01); *Y10T 428/254* (2015.01); *Y10T 428/2991* (2015.01)

(58) Field of Classification Search
CPC .............. B27N 3/005; Y10T 428/2991; Y10T 428/254; Y10T 428/25; Y10T 428/253
USPC .......... 428/304.4, 315.9, 316.6, 317.1, 317.3, 428/317.7, 318.8, 319.9
See application file for complete search history.

(56) References Cited

U.S. PATENT DOCUMENTS

| | | | | |
|---|---|---|---|---|
| 2,898,632 | A * | 8/1959 | Irwin et al. | 264/48 |
| 3,963,816 | A * | 6/1976 | Smith | 264/53 |
| 4,513,105 | A | 4/1985 | Hahn et al. | |
| 4,525,484 | A | 6/1985 | Hahn et al. | |
| 5,104,903 | A | 4/1992 | Hahn et al. | |
| 5,554,429 | A | 9/1996 | Iwata et al. | |
| 6,340,713 | B1 | 1/2002 | Glueck et al. | |
| 2003/0024443 | A1 | 2/2003 | Hoshi | |
| 2005/0019548 | A1 | 1/2005 | Liu et al. | |
| 2010/0190021 | A1 | 7/2010 | Ruba et al. | |
| 2010/0297425 | A1 | 11/2010 | Gehringer et al. | |
| 2011/0039090 | A1 | 2/2011 | Weinkotz et al. | |

FOREIGN PATENT DOCUMENTS

| | | | |
|---|---|---|---|
| CH | 370229 | | 8/1963 |
| DE | 845264 | | 8/1952 |
| DE | 3921148 | A1 | 1/1991 |
| EP | 0106129 | A2 | 4/1984 |
| EP | 0981574 | B1 | 9/2000 |
| JP | 59089136 | A * | 5/1984 |
| JP | 6031708 | A | 2/1994 |
| WO | WO-02/38676 | A1 | 5/2002 |
| WO | WO 2008/046890 | | 4/2008 |

OTHER PUBLICATIONS

Abstract of JP 59089136A. See above for date and inventor.*
ANSI A208.2, published 2002.*
Office action mailed Feb. 16, 2011 in U.S. Appl. No. 12/679,181.
U.S. Appl. No. 12/446,245, filed Apr. 20, 2009, Gehringer et al.

* cited by examiner

*Primary Examiner* — Victor Chang
(74) *Attorney, Agent, or Firm* — Drinker Biddle & Reath LLP

(57) ABSTRACT

A light wood-containing material having an average density in the range from 200 to 600 kg/$m^3$, comprising, based in each case on the wood-containing material:
A) from 30 to 95% by weight of wood particles;
B) from 1 to 25% by weight of a filler having a bulk density in the range from 10 to 150 kg/$m^3$, selected from the group consisting of foamable plastic particles and already foamed plastic particles;
C) from 0.1 to 50% by weight of a binder and, if appropriate,
D) additives,
the following relationship being true for the d' values according to Rosin-Rammler-Sperling-Bennet of the wood particles A) and of the particles of the filler B):
d' of the particles A) ≤2.5×d' of the particles B).

10 Claims, No Drawings

LIGHT WOOD-BASED MATERIALS

CROSS-REFERENCE TO RELATED APPLICATIONS

This application is a national stage application (under 35 U.S.C. §371) of PCT/EP2007/061167, filed Oct. 18, 2007, which claims benefit of European application 06122557.9, filed Oct. 19, 2006.

BACKGROUND OF THE INVENTION

The present invention relates to a light wood-containing material having an average density in the range from 200 to 600 kg/$m^3$, comprising, based in each case on the wood-containing material:

A) from 30 to 95% by weight of wood particles;

B) from 1 to 25% by weight of a filler having a bulk density in the range from 10 to 150 kg/$m^3$, selected from the group consisting of foamable plastic particles and already foamed plastic particles;

C) from 0.1 to 50% by weight of a binder and, if appropriate,

D) additives, the following relationship being true for the d' values according to Rosin-Rammler-Sperling-Bennet of the wood particles A) and of the particles of the filler B):

d' of the particles A) ≤2.5×d' of the particles B).

The present invention furthermore relates to a multilayer wood-base material comprising the wood-containing material according to the invention, a process for the production of light wood-containing materials, a process for the production of a multilayer wood-base material, the use of the light wood-containing material according to the invention and of the multilayer wood-base material according to the invention.

Wood-base materials, in particular multilayer wood-base materials, are an economical and resource-protecting alternative to solid wood and have become very important in particular in furniture construction, in laminate floors and as building materials. Starting materials used are wood particles of different thickness, e.g. woodchips or wood fibers from various timbers. Such wood particles are usually pressed with natural and/or synthetic binders and, if appropriate, with addition of further additives to give board-like or strand-like wood-base materials.

In order to achieve good mechanical properties of the wood-base materials, these are produced with a density of about 650 kg/$m^3$ or more. Wood-base materials of this density or the corresponding parts, such as furniture, are often too heavy for users, in particular private consumers.

The industrial demand for light wood-base materials has therefore increased steadily in recent years, in particular since take-away furniture has grown in popularity. Furthermore, the increasing oil price, which leads to an ongoing increase in, for example, the transport costs, is creating greater interest in light wood-base materials.

In summary, light wood-base materials are very important for the following reasons:

Light wood-base materials lead to simpler handling properties of the products by the end customer, for example on packing, transporting, unpacking or assembly of the furniture.

Light wood-base materials lead to lower transport and packaging costs; furthermore, material costs can be reduced in the production of light wood-base materials.

Light wood-base materials can lead to a lower energy consumption, for example when used in means of transport. Furthermore, for example, material-consumptive decorative parts, such as thicker worktops and side panels in kitchens, which are currently in fashion, can be offered at more favorable cost with the use of light wood-base materials.

Against this background, there is the desire to provide light wood-base materials having, as in the past, good performance characteristics and processing properties.

The prior art contains a wide range of proposals for reducing the density of the wood-base materials.

For example, tubular particle boards and honeycomb boards may be mentioned as light wood-base materials which are obtainable by design measures. Owing to their particular properties, tubular particle boards are used mainly as an inner layer in the production of doors.

A disadvantage of the honeycomb board is, for example, the insufficient screw pull-out resistance, the difficult fastening of fittings and the difficulties in edging.

Furthermore, the prior art contains proposals for reducing the density of the wood-base materials by additions to the glue or to the wood particles.

CH 370229 describes light and at the same time pressure-resistant compression-molded materials which consist of woodchips or fibers, a binder and a porous plastic serving as filler. For the production of the compression-molded materials, the woodchips or fibers are mixed with binder and foamable or partly foamable plastics, and the mixture obtained is pressed at elevated temperature. Binders which may be used are all customary binders suitable for the gluing of wood, such as, for example, urea-formaldehyde resins. Suitable fillers are foamable or ready foamed plastic particles, preferably expandable thermoplastics, such as styrene polymers. The boards described in the examples have a density of from 220 kg/$m^3$ to 430 kg/$m^3$ and a mean flexural strength of from 3.6 N/$mm^2$ to 17.7 N/$mm^2$ at a thickness of from 18 to 21 mm. Transverse tensile strengths are not stated. CH 370229 makes no statement regarding the correlation of the wood particle sizes with the filler particle sizes.

WO 02/38676 describes a process for the production of light products, in which from 5 to 40% by weight of foamable or ready foamed polystyrene having a particle size of less than 1 mm, from 60 to 95% by weight of lignocellulose-containing material and binder are mixed and are pressed at elevated temperature and superatmospheric pressure to give the finished product. The customary binders are mentioned. WO 02/38676 makes no statement regarding the correlation of the wood particle sizes with the filler particle sizes.

JP 06031708 describes light wood-base materials, a mixture of 100 parts by weight of wood particles and from 5 to 30 parts by weight of particles of synthetic resin foam being used for the middle layer of a three-layer particle board, these resin particles having a specific gravity of not more than 0.3 g/$cm^3$ and a compressive strength of at least 30 kg/$cm^2$. Furthermore, it is stated that the specific density of the wood particles should not exceed a value of 0.5 g/$cm^3$. According to JP 06031708, the binders are not subject to any restrictions. JP 06031708 makes no statement regarding the correlation of the wood particle sizes with the filler particle sizes.

In summary, the disadvantage of the prior art is that the light (wood-base) materials described have, for example for furniture production, insufficient mechanical strength, such as, for example, insufficient screw pull-out resistance.

Insufficient mechanical strength can lead, for example, to breaking or tearing of the components. Furthermore, these components tend to additional flaking-off of further wood material on drilling or sawing. In the case of these materials, the fastening of fittings is complicated.

With regard to the combination of good transverse tensile strength with good flexural strength, too, there remains room for improvement in the case of the wood-base materials of the prior art.

The object of the present invention was to provide light wood-containing materials and light wood-base materials which have a lower density compared with the commercially available wood-base materials in combination with good mechanical strengths and good processing properties.

The mechanical strength can be determined, for example, by measuring the transverse tensile strength according to DIN EN 319 or the flexural strength according to DIN EN 310.

Furthermore, these light wood-base materials should preferably be capable of being produced with the use of indigenous, European timbers.

Furthermore, the swelling value of the light wood-base materials should not be adversely affected by the reduced density.

BRIEF SUMMARY OF THE INVENTION

The object was achieved by a light wood-containing material having an average density in the range from 200 to 600 $kg/m^3$, comprising, based in each case on the wood-containing material:

A) from 30 to 95% by weight of wood particles;

B) from 1 to 25% by weight of a filler having a bulk density in the range from 10 to 150 $kg/m^3$, selected from the group consisting of foamable plastic particles and already foamed plastic particles;

C) from 0.1 to 50% by weight of a binder and, if appropriate,

D) additives, the following relationship being true for the d' values according to Rosin-Rammler-Sperling-Bennet of the wood particles A) and of the particles of the filler B):

d' of the particles A) δ 2.5×d' of the particles B).

The sum of the components A) to D) is 100% by weight and is based on the solids of the wood-containing material.

DETAILED DESCRIPTION OF THE INVENTION

The invention relates to a light wood-containing material having an average density in the range from 200 to 600 $kg/m^3$, comprising, based in each case on the wood-containing material:

A) from 30 to 95% by weight of wood particles;

B) from 1 to 25% by weight of a filler having a bulk density in the range from 10 to 150 $kg/m^3$, selected from the group consisting of foamable plastic particles and already foamed plastic particles;

C) from 0.1 to 50% by weight of a binder and, optionally,

D) additives, the following relationship being true for the d' values according to Rosin-Rammler-Sperling-Bennet of the wood particles A) and of the particles of the filler B):

d' of the particles A) ≤2.5×d' of the particles B).

The wood-containing material may comprise the customary small amounts of water (in a customary small range of variation); this water is not taken into account in the weight data of the present application.

The weight data of the wood particles are based, in the usual manner known to the person skilled in the art, on dried wood particles.

The weight data of the binder C) are based, with regard to the aminoplast component in the binder, on the solids content of the corresponding component (as determined by evaporation of the water at 120° C. in the course of 2 h according to, for example, Günter Zeppenfeld, Dirk Grunwald, Klebstoffe in der Holz-und Möbelindustrie, 2nd edition, DRW-Verlag, page 268).

The weight data of the binder C) are based, with regard to organic isocyanate having at least two isocyanate groups, on this substance per se, i.e. without taking into account, for example, solvent.

The light wood-containing materials according to the invention have an average density of from 200 to 600 $kg/m^3$, preferably from 200 to 575 $kg/m^3$, particularly preferably from 250 to 550 $kg/m^3$, in particular from 300 to 500 $kg/m^3$.

The transverse tensile strength of the light wood-containing materials according to the invention or preferably of the multilayer wood-base materials according to the invention is in the range from 0.1 $N/mm^2$ to 1.0 $N/mm^2$, preferably from 0.3 to 0.8 $N/mm^2$, particularly preferably from 0.30 to 0.6 $N/mm^2$.

The transverse tensile strength is determined according to DIN EN 319.

The flexural strength of the light wood-containing materials according to the invention or preferably of the multilayer wood-base materials according to the invention is in the range from 3 $N/mm^2$ to 30 $N/mm^2$, preferably from 5 to 25 $N/mm^2$, particularly preferably from 9 to 20 $N/mm^2$.

The flexural strength is determined according to DIN EN 310.

Suitable multilayer wood-base materials are all materials which are produced from wood veneers, preferably having an average density of the wood veneers of from 0.4 to 0.85 $g/cm^3$, for example veneer boards or plywood boards or laminated veneer lumber (LVL).

Particularly suitable multilayer wood-base materials are all materials which are produced from woodchips, preferably having an average density of the woodchips of from 0.4 to 0.85 $g/cm^3$, for example particle boards or OSB boards, and wood fibers, such as LDF, MDF and HDF boards. Particle boards and fiber boards are preferred, in particular particle boards.

The average density of the wood particles of component A) is as a rule from 0.4 to 0.85 $g/cm^3$, preferably from 0.4 to 0.75 $g/cm^3$, in particular from 0.4 to 0.6 $g/cm^3$.

Any desired type of wood is suitable for the production of the wood particles A); for example, spruce, beech, pine, larch, linden, poplar, ash, chestnut or fir wood is suitable; spruce and/or beech wood are preferred, in particular spruce wood.

The dimensions of the wood particles A) are by themselves not critical according to the present state of knowledge and usually depend on the wood-base material to be produced, for example the abovementioned wood-base materials, such as particle board or OSB.

The tailoring of the dimensions of the wood particles A) to the dimensions of the filler particles B) is, however, essential to the invention, as described herein.

Wood particles A) suitable in the context of the invention have a d' value according to Rosin-Rammler-Sperling-Bennet (definition and termination of the d' value as described below) in the range from 0.1 to 5.0, preferably in the range from 0.3 to 3.0 and particularly preferably in the range from 0.5 to 2.75.

Plastic particles which are still compact and foamable or already foamed, preferably thermoplastic particles, are suitable as filler B). However, it is also possible to use plastic particles which are in any desired intermediate stage of foaming.

Filler B) may also comprise plastic foam particles which can be obtained from moldings, for example from polyurethane foam moldings, polyethylene foam moldings, polypropylene foam moldings or preferably polystyrene foam moldings, by comminution, preferably milling, in an amount in the range from 1% by weight to 100% by weight, preferably in the range from 15% by weight to 85% by weight, particularly preferably in the range from 25% by weight to 75% by weight, very particularly preferably in the range from 40% by weight to 60% by weight, based in each case on the component B).

Unless expressly stated otherwise, all these foamable or foamed or prefoamed plastic particles or plastic particles obtained by comminution are referred to below as plastic particles according to the invention.

The term foamed plastic or especially foam is explained, for example, in DIN 7726: 1982-05.

Suitable polymers on which the plastic particles according to the invention are based are all polymers, preferably thermoplastic polymers, which can be foamed. Thee are known to the person skilled in the art.

Suitable polymers of this type are, for example, PVC (rigid and flexible), polycarbonates, polyisocyanurates, polycarbodiimides, polyacrylimides and polymethacrylimides, polyamides, polyurethanes, aminoplast resins and phenol resins, styrene homopolymers, styrene copolymers, $C_2$-$C_{10}$-olefin homopolymers, $C_2$-$C_{10}$-olefin copolymers and polyesters. 1-Alkenes, for example ethylene, propylene, 1-butene, 1-hexene or 1-octene, are preferably used for the preparation of said olefin polymers.

The plastic particles according to the invention of component B) have a bulk density of from 10 to 150 kg/$m^3$, preferably from 15 to 80 kg/$m^3$, particularly preferably from 20 to 70 kg/$m^3$, in particular from 30 to 60 kg/$m^3$. The bulk density is usually determined by weighing a defined volume filled with the bulk material.

Prefoamed plastic particles according to the invention are generally used in the form of spheres or beads having a mean diameter of advantageously from 0.25 to 10 mm, preferably from 0.5 to 5 mm, in particular from 0.75 to 3 mm.

Prefoamed plastic particle spheres according to the invention advantageously have a small surface area per unit volume, for example in the form of a spherical or elliptical particle.

The prefoamed plastic particle spheres according to the invention advantageously have closed cells. The proportion of open cells according to DIN-ISO 4590 is as a rule less than 30%.

Plastic foam particles which can be obtained from moldings, for example from polyurethane foam moldings, polyethylene foam moldings, polypropylene foam moldings or preferably polystyrene foam moldings, by comminution, preferably milling, generally have an irregular shape but may also be spherical.

If the filler B) consists of different polymer types, i.e. polymer types based on different monomers (for example polystyrene and polyethylene or polystyrene and homopolypropylene or polyethylene and homopolypropylene), these may be present in different weight ratios, which, however, are not critical according to the current state of knowledge.

Furthermore, additives, nucleating agents, plasticizers, flameproofing agents, soluble and insoluble inorganic and/or organic dyes and pigments, e.g. IR absorbers, such as carbon black, graphite or aluminum powder, can be added together or spatially separately as additives to the thermoplastics according to the invention.

Polystyrene and/or styrene copolymer, in each case including that which is obtained by comminution of moldings, are preferably used as the only plastic particle component according to the invention in filler B).

The filler polystyrene and/or styrene copolymer can be prepared by all polymerization processes known to the person skilled in the art [cf. for example Ullmann's Encyclopedia, Sixth Edition, 2000 Electronic Release]. For example, the preparation is effected in a manner known per se by suspension polymerization or by means of extrusion processes.

In the suspension polymerization, styrene, if appropriate with addition of further comonomers, is polymerized in aqueous suspension in the presence of a customary suspension stabilizer by means of catalysts forming free radicals. The blowing agent and, if appropriate, further additives can also be initially taken together in the polymerization or added to the batch in the course of the polymerization or after the end of the polymerization. The bead-like expandable styrene polymers obtained are separated off from the aqueous phase after the end of the polymerization, washed, dried and sieved.

In the extrusion process, the blowing agent is mixed into the polymer, for example via an extruder, transported through a die plate and granulated to give particles or extrudates.

Blowing agents which may be used are all blowing agents known to the person skilled in the art, for example $C_3$- to $C_6$-hydrocarbons, such as propane, n-butane, isobutane, n-pentane, isopentane, neopentane and/or hexane, alcohols, ketones, ethers or halogenated hydrocarbons. A commercially available pentane isomer mixture is preferably used.

Furthermore, additives, nucleating agents, plasticizers, flameproofing agents, soluble and insoluble inorganic and/or organic dyes and pigments, e.g. IR absorbers, such as carbon black, graphite or aluminum powder, can be added together or spatially separately as additives to the styrene polymers.

If appropriate, styrene copolymers may also be used; these styrene copolymers advantageously comprise at least 50% by weight, preferably at least 80% by weight, of styrene incorporated in the form of polymerized units. Suitable comonomers are, for example, α-methylstyrene, styrenes halogenated on the nucleus, acrylonitrile, esters of acrylic or methacrylic acid with alcohols having 1 to 8 carbon atoms, N-vinylcarbazole, maleic acid (anhydride), (meth)acrylamides and/or vinyl acetate.

Advantageously, the polystyrene and/or styrene copolymer may comprise a small amount of a chain-branching agent incorporated in the form of polymerized units, i.e. of a compound having more than one double bond, preferably two double bonds, such as divinylbenzene, butadiene and/or butanediol diacrylate. The branching agent is generally used in amounts of from 0.005 to 0.05 mol %, based on styrene.

Advantageously, styrene (co)polymers having molecular weights and molecular weight distributions as described in EP-B 106 129 and in DE-A 39 21 148 are used. Styrene (co)polymers having a molecular weight in the range from 190 000 to 400 000 g/mol are used with preference.

Mixtures of different styrene (co)polymers may also be used.

Preferably used styrene polymers are highly transparent polystyrene (GPPS), high impact polystyrene (HIPS), anionically polymerized polystyrene or impact-resistant polystyrene (A-IPS), styrene/α-methylstyrene copolymers, acrylonitrile/butadiene/-styrene polymers (ABS), styrene/acrylonitrile (SAN), acrylonitrile/styrene/acrylate (ASA), methyl acrylate/butadiene/styrene (MBS), methyl methacrylate/acrylonitrile/-butadiene/styrene (MABS) polymers and mixtures thereof or with polyphenylene ether (PPE).

Styropor®, Neopor® and/or Peripor® from BASF Aktiengesellschaft is particularly preferably used as polystyrene.

Already prefoamed polystyrene and/or styrene copolymers are advantageously used.

In general, the prefoamed polystyrene can be prepared by all processes known to a person skilled in the art (for example DE 845 264). For the preparation of prefoamed polystyrene and/or prefoamed styrene copolymers, the expandable styrene polymers are expanded in a known manner by heating to temperatures above their softening point, for example with hot air or preferably steam.

The prefoamed polystyrene or prefoamed styrene copolymer of component B) and, if appropriate, the plastic particles according to the invention of component B) which are obtained by comminution of corresponding polystyrene or styrene copolymer moldings advantageously have a bulk density of from 10 to 150 kg/$m^3$, preferably from 15 to 80 kg/$m^3$, particularly preferably from 20 to 70 kg/$m^3$, in particular from 30 to 60 kg/$m^3$.

The prefoamed polystyrene or prefoamed styrene copolymer is advantageously used in the form of spheres or beads having a mean diameter of, advantageously, from 0.25 to 10 mm, preferably from 0.5 to 5 mm, in particular from 0.75 to 3 mm.

The prefoamed polystyrene spheres or prefoamed styrene copolymer spheres advantageously have a small surface area per unit volume, for example in the form of a spherical or elliptical particle.

The prefoamed polystyrene spheres or prefoamed styrene copolymer spheres advantageously have closed cells. The proportion of open cells according to DIN-ISO 4590 is as a rule less than 30%.

Shaped articles of foamed styrene polymer or styrene copolymer may serve as starting material for foamed polystyrene or foamed styrene copolymer. These can be comminuted by the customary comminution methods to the level of the individual styrene polymer or styrene copolymer particles, preferably spherical particles. A suitable and preferred comminution method is milling.

Shaped articles of foamed styrene polymer or styrene copolymer can be produced by the known methods and serve, for example, as packaging material or insulating material.

Shaped articles of foamed styrene polymer or styrene copolymer which are intended for disposal, for example styrene polymer or styrene copolymer packaging material waste or styrene polymer or styrene copolymer insulating material waste, may serve as starting material for foamed polystyrene or foamed styrene copolymer.

The polystyrene or styrene copolymer or the prefoamed polystyrene or prefoamed styrene copolymer particularly preferably has an antistatic coating.

The commonly used substances customary in industry can be used as an antistatic agent. Examples are N,N-bis(2-hydroxyethyl)-$C_{12}$-$C_{18}$-alkylamines, fatty acid diethanolamides, choline ester chlorides of fatty acids, $C_{12}$-$C_{20}$-alkylsulfonates and ammonium salts.

Suitable ammonium salts comprise on the nitrogen, in addition to alkyl groups, from 1 to 3 organic radicals containing hydroxyl groups.

Suitable quaternary ammonium salts are, for example, those which comprise from 1 to 3, preferably 2, identical or different alkyl radicals having from 1 to 12, preferably from 1 to 10, carbon atoms and from 1 to 3, preferably 2, identical or different hydroxyalkyl or hydroxyalkylpolyoxyalkylene radicals bonded to the nitrogen cation, with any desired anion, such as chloride, bromide, acetate, methylsulfate or p-toluenesulfonate.

The hydroxyalkyl and hydroxyalkylpolyoxyalkylene radicals are those which form by oxyalkylation of a nitrogen-bonded hydrogen atom and are derived from 1 to 10 oxyalkylene radicals, in particular oxyethylene and oxypropylene radicals.

A particularly preferably used antistatic agent is a quaternary ammonium salt or an alkali metal salt, in particular sodium salt, of a $C_{12}$-$C_{20}$-alkanesulfonate, e.g. emulsifier K30 from Bayer AG, or mixtures thereof. The antistatic agents can be added as a rule both as pure substances and in the form of an aqueous solution.

The antistatic agent can be added during the process for the preparation of polystyrene or styrene copolymer analogously to the customary additives or applied as a coating after the production of the polystyrene particles.

The antistatic agent is advantageously used in an amount of from 0.05 to 6% by weight, preferably from 0.1 to 4% by weight, based on the polystyrene or styrene copolymer.

Even after the pressing to give the light wood-base material, preferably multilayer wood-base material, the filler particles B) are advantageously present in a state in which their original shape is still recognizable. If appropriate, melting of the filler particles which are present on the surface of the light wood-containing material or preferably of the multilayer wood-base material may occur.

The tailoring of the dimensions of the filler particles B) to the wood particles A) or vice versa has proved to be essential to the invention. This tailoring is expressed below by the relationship of the respective d' values (from the Rosin-Rammler-Sperling-Bennet function) of the wood particles A) and of the filler particles B).

The Rossin-Rammler-Sperling-Bennet function is described, for example, in DIN 66145.

For determining the d' values, sieve analyses are first carried out to determine the particle size distribution of the filler particles B) and wood particles A) analogously to DIN 66165, parts 1 and 2, and as described in more detail in the examples.

The values from the sieve analysis are then used in the Rosin-Rammler-Sperling-Bennet function and d' is calculated.

The Rosin-Rammler-Sperling-Bennet function is:

$$R=100*\exp(-(d/d')^n))$$

with the following meanings of the parameters:

R residue (% by weight) which remains on respective sieve base d particle size d' particle size at 36.8% by weight residue n width of the particle size distribution Suitable light wood-containing materials or multilayer wood-base materials are obtained if the following relationship is true for the d' values according to Rosin-Rammler-Sperling-Bennet of the wood particles A) and of the particles of the filler B):

d' of the particles A) ≤2.5×d' of the particles B), preferably d' of the particles A) ≤2.0×d' of the particles B), particularly preferably d' of the particles A) ≤1.5×d' of the particles B), very particularly preferably d' of the particles A) ≤d' of the particles B).

The total amount of the filler B), based on the light wood-containing material, is in the range from 1 to 25% by weight, preferably from 2 to 15% by weight, particularly preferably from 3 to 12% by weight.

The total amount of the filler B) with polystyrene and/or styrene copolymer, including in each case that obtained by comminution of moldings, as the only plastic particle component, based on the light wood-containing material, is in the range from 1 to 25% by weight, preferably from 2 to 15% by weight, particularly preferably from 3 to 12% by weight.

Binders C) which may be used are all binders known to the person skilled in the art for the production of wood-base materials, for example aminoplast resins and/or organic isocyanates, such as PMDI.

The binder C) comprises as a rule the substances known to the person skilled in the art, generally used for aminoplast resins and usually designated as curing agents, such as ammonium sulfate or ammonium nitrate or inorganic or organic acids, for example sulfuric acid or formic acid, or acid-generating substances, such as aluminum chloride or aluminum sulfate, in each case in the customary, small amounts, for example in the range from 0.1% by weight to 3% by weight, based on the total amount of aminoplast resin in the binder C).

Here, aminoplast resin is understood as meaning polycondensates of compounds having at least one carbamide group optionally partly substituted by organic radicals (the carbamide group is also referred to as carboxamide group) and an aldehyde, preferably formaldehyde.

All aminoplast resins known to the person skilled in the art, preferably those known for the production of wood-base materials, can be used as suitable aminoplast resin. Such resins and their preparation are described, for example, in Ullmanns Enzyklopädie der technischen Chemie, 4th, revised and extended edition, Verlag Chemie, 1973, pages 403 to 424, "Aminoplaste" and Ullmann's Encyclopedia of Industrial Chemistry, vol. A2, VCH Verlagsgesellschaft, 1985, pages 115 to 141, "Amino Resins", and in M. Dunky, P. Niemz, Holzwerkstoffe and Leime, Springer 2002, page 251 to 259 (UF resins) and pages 303 to 313 (MUF and UF with small amount of melamine).

Preferred aminoplast resisns are polycondensates of compounds having at least one carbamide group, also partially substituted by organic radicals, and formaldehyde.

Particularly preferred aminoplast resins are urea-formaldehyde resins (UF resins), melamine-formaldehyde resins (MF resins) or melamine-containing urea-formaldehyde resins (MUF resins).

Very particularly preferred aminoplast resins are urea-formaldehyde resins, for example Kaurit® glue types from BASF Aktiengesellschaft.

Further very preferred aminoplast resins are polycondensates of compounds having at least one amino group, also partly substituted by organic radicals, and aldehyde, wherein the molar ratio of aldehyde to amino group optionally partly substituted by organic radicals is in the range from 0.3 to 1.0, preferably from 0.3 to 0.60, particularly preferably from 0.3 to 0.45, very particularly preferably from 0.30 to 0.40.

Further very preferred aminoplast resins are polycondensates of compounds having at least one amino group —$NH_2$ and formaldehyde, in which the molar ratio of formaldehyde:—$NH_2$ group is in the range from 0.3 to 1.0, preferably from 0.3 to 0.60, particularly preferably from 0.3 to 0.45, very particularly preferably from 0.30 to 0.40.

Further very preferred aminoplast resins are urea-formaldehyde resins (UF resins), melamine-formaldehyde resins (MF resins) or melamine-containing urea-formaldehyde resins (MUF resins), in which the molar ratio of formaldehyde:—$NH_2$ group is in the range from 0.3 to 1.0, preferably from 0.3 to 0.60, particularly preferably from 0.3 to 0.45, very particularly preferably from 0.30 to 0.40.

Further very preferred aminoplast resins are urea-formaldehyde resins (UF resins), in which the molar ratio of formaldehyde:—$NH_2$ group is in the range from 0.3 to 1.0, preferably from 0.3 to 0.60, particularly preferably from 0.3 to 0.45, very particularly preferably from 0.30 to 0.40.

Said aminoplast resins are usually used in liquid form, generally suspended or dissolved in a liquid suspending medium, preferably in aqueous suspension or solution, but it can also be used as solid.

The solids content of the aminoplast resin suspensions, preferably aqueous suspension, is usually from 25 to 90% by weight, preferably from 50 to 70% by weight.

The solids content of the aminoplast resin in the aqueous suspension can be determined according to &inter Zeppenfeld, Dirk Grunwald, Klebstoffe in der Holz- and Möbelindustrie, 2nd edition, DRW-Verlag, page 268. For determining the solids content of aminoplast glues, 1 g of aminoplast glue is accurately weighed into a weighing dish, finely distributed on the bottom and dried for 2 hours at 120° C. in a drying oven. After thermostating at room temperature in a desiccator, the residue is weighed and it is calculated as a percentage of the weight taken.

The aminoplast resins are prepared by known processes (cf. abovementioned Ullmann literature "Aminoplaste" and "Amino Resins" and abovementioned literature Dunky et al.) by reacting compounds containing carbamide groups, preferably urea and/or melamine, with the aldehydes, preferably formaldehyde, in the desired molar ratios of carbamide group to aldehyde, preferably in water as a solvent.

The desired molar ratio of aldehyde, preferably formaldehyde, to amino group optionally partly substituted by organic radicals can also be established by addition of monomers carrying —$NH_2$ groups to formaldehyde-richer finished, preferably commercial, aminoplast resins. Monomers carrying $NH_2$ groups are preferably urea, melamine, particularly preferably urea.

The total amount of the binder C), based on the light wood-containing material, is in the range from 0.1 to 50% by weight, preferably from 0.5 to 15% by weight, particularly preferably from 0.5 to 10% by weight.

Here, the total amount of the aminoplast resin (always based on the solid), preferably of the urea-formaldehyde resin and/or melamine-urea-formaldehyde resin and/or melamine-formaldehyde resin, particularly preferably urea-formaldehyde resin, in the binder C), based on the light wood-containing material, is in the range from 1 to 45% by weight, preferably from 4 to 14% by weight, particularly preferably from 6 to 9% by weight.

If an organic isocyanate is the only or further constituent of the binder C), the total amount of the organic isocyanate, preferably of the oligomeric isocyanate having 2 to 10, preferably 2 to 8, monomer units and on average at least one isocyanate group per monomer unit, particularly preferably PMDI, in the binder C), based on the light wood-containing material, is in the range from 0.1 to 5% by weight, preferably from 0.25 to 3.5% by weight, particularly preferably from 0.5 to 1.5% by weight.

Preferred embodiments of the light wood-containing material comprise (i) from 55 to 92.5% by weight, preferably from 60 to 90% by weight, in particular from 70 to 88% by weight, based on the light wood-containing material, of wood particles A), the wood particles A) having a average density of from 0.4 to 0.85 g/cm$^3$, preferably from 0.4 to 0.75 g/cm$^3$, in particular from 0.4 to 0.6 g/cm$^3$; (ii) from 1 to 25% by weight, preferably from 2 to 15% by weight, in particular from 3 to 12% by weight, based on the light wood-containing material, of polystyrene and/or styrene copolymer filler B), the filler B) having a bulk density of from 10 to 150 kg/m$^3$, preferably from 20 to 80 kg/m$^3$, in particular from 30 to 60 kg/m$^3$; (iii) and from 0.1 to 50% by weight, preferably from 0.5 to 15% by weight, in particular from 0.5 to 10% by weight, based on the light wood-containing material, of binder C), the total amount of the aminoplast resin, preferably of the urea-formaldehyde resin and/or melamine-urea-formaldehyde resin and/or melamine-formaldehyde resin, particularly preferably urea-formaldehyde resin, in the binder C), based on the light wood-containing material, being in the range from 1 to 45% by weight, preferably from 4 to 14% by weight, particularly preferably from 6 to 9% by weight, and the average density of the light wood-containing material being in the range from 200 to 600 kg/$m^3$, preferably in the range from 300 to 575 kg/$m^3$, and the following relationship being true for the d' values according to Rosin-Rammler-Sperling-Bennet of the wood particles A) and of the particles of the filler B): d' of the particles A) ≤2.5×d' of the particles B), preferably d' of the particles A) ≤2.0×d' of the particles B), particularly preferably d' of the particles A) ≤1.5×d' of the particles B), very particularly preferably d' of the particles A) ≤d' of the particles B).

If appropriate, further commercially available additives known to the person skilled in the art may be present as component D) in the light wood-containing material according to the invention or the multilayer wood-base material according to the invention, for example water repellents, such as paraffin emulsions, antifungal agents and flameproofing agents.

The present invention furthermore relates to a multilayer wood-base material which comprises at least three wood-base material layers, at least the middle layer or layers comprising a light wood-containing material with the following features of the light wood-containing material: an average density in the range from 200 to 600 kg/$m^3$ and comprising, based in each case on the light wood-containing material, A) from 30 to 95% of wood particles;
B) from 1 to 25% by weight of a filler having a bulk density in the range from 10 to 150 kg/$m^3$, selected from the group consisting of foamable plastic particles and already foamed plastic particles;
C) from 0.1 to 50% by weight of a binder, and, if appropriate,
D) additives, the following relationship being true for the d' values according to Rosin-Rammler-Sperling-Bennet of the wood particles A) and of the particles of the filler B):

d' of the particles A) ≤2.5×d' of the particles B).

The average density of the multilayer, preferably of the three-layer, wood-base material according to the invention is in the range from 300 kg/$m^3$ to 600 kg/$m^3$, preferably in the range from 350 kg/$m^3$ to 600 kg/$m^3$, particularly preferably in the range from 400 kg/$m^3$ to 500 kg/$m^3$.

Preferred parameter ranges and preferred embodiments with regard to the average density of the light wood-containing material and with regard to the components A), B), C) and D) and the combination of the features correspond to the above description.

The middle layers in the context of the invention are all layers which are not the outer layers.

Preferably, the outer layers (usually referred to as "covering layer(s)") have no fillers.

The multilayer wood-base material according to the invention preferably comprises three wood-base layers, the outer covering layers together accounting for from 1 to 25% of the total thickness of the multilayer wood-base material according to the invention, preferably from 3 to 20%, in particular from 5 to 15%.

The binder used for the outer layers is usually an aminoplast resin, for example urea-formaldehyde resin (UF), melamine-formaldehyde resin (MF), melamine-urea-formaldehyde resin (MUF) or the binder C) according to the invention. The binder used for the outer layers is preferably an aminoplast resin, particularly preferably a urea-formaldehyde resin, very particularly preferably an aminoplast wherein the molar ratio of formaldehyde to —$NH_2$ groups is in the range from 0.3 to 1.0.

The thickness of the multilayer wood-base material according to the invention varies with the field of use and is as a rule in the range from 0.5 to 100 mm, preferably in the range from 10 to 40 mm, in particular from 15 to 20 mm.

The present furthermore relates to a process for the production of multilayer wood-base materials according to the invention as defined above, the components for the individual layers being stacked one on top of another and pressed at elevated temperature and superatmospheric pressure.

The processes for the production of multilayer wood-base materials are known in principle and are described, for example, in M. Dunky, P. Niemz, Holzwerkstoffe and Leime, Springer 2002, pages 91 to 150.

An example of a process for the production of the multilayer wood-base materials according to the invention is described below.

After conversion of the wood into chips, the chips are dried. If appropriate, coarse and fine fractions are then removed. The remaining chips are sorted by sieving or classification in an air stream. The coarser material is used for the middle layer and the finer material for the covering layers. Middle layer and covering layer chips are treated with glue or mixed separately from one another in each case with the components B) (only the middle layer(s)), C) (middle layer) and, if appropriate, D) (middle layer and/or covering layers) and with an aminoplast resin (covering layer) and then sprinkled. First, the covering layer material is sprinkled onto the molding belt, then the middle material—comprising the components B), C) and, if appropriate, D)- and finally once again covering layer material. The three-layer chip cake thus produced is precompressed while cold (as a rule at room temperature) and then pressed at elevated temperature. The pressing can be effected by all methods known to the person skilled in the art. Usually, the wood particle cake is pressed at a press temperature of from 150° C. to 230° C. to the desired thickness. The duration of pressing is usually from 3 to 15 seconds per mm of board thickness. A three-layer particle board is obtained.

Preferred parameter ranges and preferred embodiments with regard to the average density of the light wood-containing material and of the multilayer wood-base material and with regard to the components A), B), C) and, if appropriate, D) and the combination of the features correspond to the above description. In a further preferred embodiment, the prefoamed or non-prefoamed polystyrene and/or styrene copolymer is provided with an antistatic coating prior to mixing with the binder and/or the wood particles. The above statements apply with regard to the antistatic agent.

Furthermore, the present invention relates to the use of the light wood-containing material according to the invention and of the multilayer wood-base material according to the invention for the production of articles of all types, for example furniture, furniture parts or packaging materials, the use of the light wood-containing material according to the invention and of the multilayer wood-base material according to the invention in the construction sector. Examples of articles of all types in addition to pieces of furniture, furniture parts and packaging materials, are wall and ceiling elements, doors and floors.

Examples of furniture or furniture parts are kitchen furniture, cabinets, chairs, tables, worktops, for example for kitchen furniture, and desktops.

Examples of packaging materials are crates and boxes.

Examples of the construction sector are building construction, civil engineering, interior finishing, tunnel construction, where the wood-containing materials according to the invention or multilayer wood-base materials according to the invention can be used as formwork boards or as supports.

The advantages of the present invention are the low density of the light wood-containing material according to the invention or multilayer wood-base material according to the invention, good mechanical stability being retained. In particular, the wood-containing material according to the invention or the multilayer wood-base material according to the invention has good transverse tension values in combination with good flexural strength values. Furthermore, the light wood-containing material according to the invention and multilayer wood-base material according to the invention can be easily produced; there is no need to convert the existing plants for the production of the multilayer wood-base materials according to the invention.

The edging properties of the light wood-containing materials according to the invention or particularly of the multilayer wood-base materials according to the invention are surprisingly good. The edge adheres particularly well and is not uneven or wavy, the narrow surface, in particular of the multilayer wood-base material, does not show through the edge, the edge is stable to pressure and the edging can be effected using the customary machines of board production and edging.

The swelling values of the multilayer wood-base materials according to the invention are advantageously 10% less, preferably 20% less, in particular 30% less, than the swelling values of an analogous board of the same density without filler.

EXAMPLES

Example 1

Preparation of Prefoamed Polystyrene by Preexpansion ePS (expandable polystyrene, commercially available from BASF Aktiengesellschaft as Neopor®, Styropor® or Peripor) was treated with steam in a continuous preexpander. The bulk density of the prefoamed polystyrene spheres was adjusted by varying the vapor pressure and the steam application time.

Example 2

Sieve Analysis

Principles and procedure of sieve analysis are described in the standard DIN 66165 parts 1 and 2. This was used analogously as follows.

The characterization of the particle size distribution of the woodchips A) or of the component B) was effected by screening as follows:

The samples delivered were divided with the aid of a riffle sampler in a plurality of stages to an amount of about 20-30 g (for wood samples) and of 6-8 g (for prefoamed polystyrene). The samples thus produced were carefully added to the screen set used. The screen set was composed according to the standard DIN ISO 3310 part 1 with screens of the main series R20/3 (nominal mesh sizes in µm: 5600-4000-2800-2000-1400-1000-710-500-355-250-180-125). If too many screens are required, the screen set is divided and the screening is carried out in two steps. In this case, the undersize of the coarse-mesh screen set forms the feed material for the fine-mesh screen set.

The screen sets used are stated in the corresponding examples.

The screening was effected using an oscillating screen, and the duration of screening was fixed at 5 minutes. The weighing of the screens was carried out using a suitable precision balance. In the case of prefoamed polystyrene, owing to the narrow distribution, yet further screens were introduced in order to obtain a better resolution of the particle size distribution by a narrower gradation of the mesh sizes.

Example 3

Analysis of Relatively Coarse Woodchips, Sample No. 1

Commercially used spruce chips (sample No. 1) were screened by the method described above and the fractions weighed.

The following particle size distribution was obtained:

| Nominal mesh size in µm | % by weight |
|---|---|
| 125.00 | 0.141 |
| 180.00 | 0.23 |
| 250.00 | 0.89 |
| 355.00 | 1.08 |
| 500.00 | 2.11 |
| 710.00 | 3.85 |
| 1000.00 | 10.28 |
| 1400.00 | 27.51 |
| 2000.00 | 49.81 |
| 2800.00 | 76.01 |
| 4000.00 | 91.69 |
| 5600.00 | 98.45 |

The proportion by weight of the fractions remaining behind in each case on the screens is determined by calculating the difference between the % by weight values of the respective nominal mesh sizes; for example, the residue on the screen having the nominal mesh size 5600 µm is calculated from 100% by weight−98.45% by weight=1.55% by weight and that on the screen having the nominal mesh size 4000 µm from 98.45% by weight−91.69% by weight=6.76% by weight. The % by weight values are based on the initial amount of the material to be screened.

The following values are then obtained using the Rosin-Rammler-Sperling-Bennet function:

d'=2.41 mm n=2.24

Example 4

Analysis of Relatively Small Woodchips

Sample No. 2

Spruce chips suitable for laboratory experiments were screened by the method described in Example 2 and the fractions were weighed.

The following particle size distribution was obtained

| Nominal mesh size in µm | % by weight |
|---|---|
| 125.00 | 1.04 |
| 180.00 | 2.78 |
| 250.00 | 6.25 |
| 355.00 | 15.28 |
| 500.00 | 45.14 |
| 710.00 | 68.40 |
| 1000.00 | 91.67 |
| 1400.00 | 100.00 |

The following values were then obtained using the Rosin-Rammler-Sperling-Bennet function:

d'=0.66 mm n=2.55

Example 5

Analysis of the Foamed Polystyrene Sample No. 1

Prefoamed polystyrene spheres having a bulk density of 50 g/l were produced as described above from expandable polystyrene having a particle size of from 1.4 to 2.5 mm. The product was screened as described above and the sieve fractions were weighed.

The following particle size distribution was obtained:

| Nominal mesh size in μm | % by weight |
|---|---|
| 2500 | 0.40 |
| 3150 | 0.80 |
| 3550 | 1.80 |
| 4000 | 28.70 |
| 4500 | 70.00 |
| 5000 | 98.70 |
| 5600 | 100.00 |

The following values were then obtained using the Rosin-Rammler-Sperling-Bennet function:

d'=4.42 mm n=12.13

Example 6

Analysis of the Foamed Polystyrene Sample No. 2

Prefoamed polystyrene spheres having a bulk density of 50 g/I were produced as described above from expandable polystyrene having a particle size of 0.2-0.4 mm. The product was screened as described above and the sieve fractions were weighed.

The following particle size distribution was obtained:

| Nominal mesh size in μm | % by weight |
|---|---|
| 250 | 1.10 |
| 355 | 4.10 |
| 500 | 14.00 |
| 630 | 26.60 |
| 800 | 42.80 |
| 1000 | 73.80 |
| 1250 | 93.00 |
| 1400 | 94.80 |
| 1600 | 97.20 |
| 1800 | 98.70 |
| 2000 | 99.80 |

The following values were then obtained using the Rosin-Rammler-Sperling-Bennet function:

d'=0.93 mm n=3.16

Example 7

Production of the Multilayer Wood-Base Materials with and without Fillers Using Urea-Formaldehyde Glues 1) Mixing of the Starting Materials The glue used was urea-formaldehyde glue (Kaurit® glue 340 from BASF Aktiengesellschaft). The solids content was adjusted in each case to 67% by weight with water. For more details, cf. also in table.

1.1) For the Covering Layer:

500 g of fine spruce chips (2% by weight residual moisture) were mixed with 92 g of a glue liquor comprising 100 parts of Kaurit® glue 340 (solids content 67% by weight), 4 parts of a 52% strength by weight ammonium nitrate solution (as curing agent) and 10 parts of water in a mixer.

1.2) For the Middle Layer:

500 g of the components A) (spruce chips, residual moisture 2% by weight) and B) were mixed in the weight ratio according to the table in a mixer. 92 g of a glue liquor comprising 100 parts of Kaurit® glue 340 (solids content 67% by weight), 4 parts of an aqueous 52% strength by weight ammonium nitrate solution and 10 parts of water were then applied.

2) Pressing of the Glue-Coated Chips

The material for the production of a three-layer particle board was sprinkled into a 30×30 cm mold. First the covering layer material, then the middle layer material, and finally once again the covering material were sprinkled. The total mass was chosen so that the desired density at a required thickness of 16 mm results at the end of the pressing process. The mass ratio (weight ratio) of covering layer material: middle layer material:covering layer material was 17:66:17 in all experiments. The mixture described above under 1.1) was used as covering layer material in all experiments. The middle layer material was produced according to 1.2) and varied according to the table.

After the sprinkling, the preliminary compaction was effected at room temperature, i.e. “cold”, and pressing was then effected in a hot press (press temperature 190° C., press time 210 s). The required thickness of the board was 16 mm in each case.

Example 8

Investigation of the Light Wood-Containing Material

1) Density

The density was determined 24 hours after production according to DIN EN 1058.

2) Transverse Tensile Strength

The transverse tensile strength was determined according to DIN EN 319.

3) Swelling Values and Water Absorption

The swelling values and water absorption were determined according to DIN EN 317.

4) Flexural Strength

The flexural strength was determined according to DIN EN 310.

The results of the experiments are listed in the table.

The stated amounts are always based on the dry substance. In stating the parts by weight, the dry wood or the sum of the dry wood and of the filler is set at 100 parts. In stating the percentages by weight, the sum of all dry constituents of the light wood-containing material is equal to 100%.

The experiments in the table without addition of component B) are for comparison.

TABLE

Results of the examples

| Middle layer | | | | | | |
|---|---|---|---|---|---|---|
| Wood component A), particles according to | ePS component B) particles according to | Component A):Component B), parts by weight | Density $kg/m^3$ | Transverse tensile strength, $N/mm^2$ | Water absorption, % by weight | Swelling, % by weight |
| Example 3 d' = 2.41 mm [1] | Example 6 d' = 0.93 mm | 90/10 | 606 | 0.75 | 84.7 | 20.4 |
| Example 3 d' = 2.41 mm [1] | Example 6 d' = 0.93 mm | 90/10 | 565 | 0.62 | 94 | 18.7 |
| Example 3 d' = 2.41 mm [1] | Example 6 d' = 0.93 mm | 90/10 | 507 | 0.49 | 106 | 16.3 |
| Example 3 d' = 2.41 mm | Example 5 d' = 4.42 mm | 90/10 | 506 | 0.76 | 94.7 | 12.9 |
| Example 3 d' = 2.41 mm | Example 5 d' = 4.42 mm | 90/10 | 558 | 0.86 | 84.5 | 15.5 |
| Example 3 d' = 2.41 mm | Example 5 d' = 4.42 mm | 90/10 | 599 | 1.05 | 77.9 | 16.7 |
| Example 3 d' = 2.41 mm [1] | none | 100/0 | 464 | 0.44 | 125 | 15.8 |
| Example 3 d' = 2.41 mm [1] | none | 100/0 | 653 | 0.96 | 82 | 20.2 |
| Example 3 d' = 2.41 mm [1] | none | 100/0 | 607 | 0.81 | 92.5 | 19 |
| Example 3 d' = 2.41 mm [1] | none | 100/0 | 553 | 0.67 | 102 | 17.6 |
| Example 4 d' = 0.66 mm | Example 6 d' = 0.93 mm | 90/10 | 579 | 0.85 | 85.7 | 20.2 |
| Example 4 d' = 0.66 mm | Example 6 d' = 0.93 mm | 90/10 | 518 | 0.74 | 97.4 | 18.2 |
| Example 4 d' = 0.66 mm | Example 6 d' = 0.93 mm | 90/10 | 497 | 0.61 | 104.3 | 17.5 |
| Example 4 d' = 0.66 mm | Example 5 d' = 4.42 mm | 90/10 | 573 | 0.76 | 80.5 | 17.2 |
| Example 4 d' = 0.66 mm | Example 5 d' = 4.42 mm | 90/10 | 508 | 0.63 | 90.8 | 14.3 |
| Example 4 d' = 0.66 mm | Example 5 d' = 4.42 mm | 90/10 | 477 | 0.53 | 98.7 | 14.0 |
| Example 4 d' = 0.66 mm [1] | none | 100/0 | 556 | 0.57 | 120.5 | 22.8 |
| Example 4 d' = 0.66 mm [1] | none | 100/0 | 499 | 0.47 | 126.7 | 17.2 |
| Example 4 d' = 0.66 mm [1] | none | 100/0 | 460 | 0.40 | 139.3 | 16.4 |

[1]: for comparison

We claim:

1. A light wood-containing material having an average density in the range from 200 to 600 $kg/m^3$, comprising a composition made from, based in each case on the wood-containing material:

A) from 30 to 95% by weight of wood particles;

B) from 1 to 25% by weight of a filler having a bulk density in the range from 10 to 150 $kg/m^3$, selected from the group consisting of foamable plastic particles and already foamed plastic particles;

C) from 0.1 to 50% by weight of a binder and, optionally,

D) additives, wherein the following relationship is true for the d' values according to Rosin-Rammler-Sperling-Bennet of the wood particles A) and of the particles of the filler B):

d' of the particles A) $\leq 2.5\times$d' of the particles B).

2. The light wood-containing material according to claim 1, wherein the component B) is selected from the group consisting of styrene homopolymer, styrene copolymer, $C_2$- to $C_{10}$-olefin homopolymer, copolymers of $C_2$- to $C_{10}$-olefins, PVC (rigid and flexible), polycarbonate, polyisocyanurate, polycarbodiimide, polyacrylimide, polymethacrylimide, polyamide, polyester, polyurethane, aminoplast resin and phenol resin.

3. The light wood-containing material according to claim 1, wherein the component B) being selected from the group consisting of styrene homopolymer and styrene copolymer.

4. The light wood-containing material according to claim 1, wherein the component C) is an aminoplast resin selected from the group consisting of urea-formaldehyde resin, melamine-formaldehyde resin, melamine-urea-formaldehyde resin.

5. The light wood-containing material according to claim 1, wherein the content of the aminoplast resin in the component C), based on the light wood-containing material, being in the range from 1 to 45% by weight.

6. The light wood-containing material according to claim 1, having an average density in the range from 300 $kg/m^3$ to 500 $kg/m^3$.

7. The light wood-containing material according to claim 1, having a transverse tensile strength in the range from 0.1 $N/mm^2$ to 1.0 $N/mm^2$ wherein the tensile strength is determined according to DIN EN 319.

8. A multilayer wood-base material which comprises at least three layers, only the middle layer or at least part of the middle layers comprising the light wood-containing material according to claim 1.

9. A multilayer wood-base material which comprises at least three layers, only the middle layer or at least part of the middle layers comprising the light wood-containing material according to claim 1 and the outer covering layers comprising no filler.

10. An article which comprises the light wood-containing material as claimed in claim 1.

* * * * *